US010020150B2

(12) United States Patent
Nagler et al.

(10) Patent No.: US 10,020,150 B2
(45) Date of Patent: Jul. 10, 2018

(54) METHOD FOR OPERATING AN ELECTROMOTIVE ADJUSTING DEVICE, AND ELECTROMOTIVE ADJUSTING DEVICE

(71) Applicant: BROSE FAHRZEUGTEILE GMBH & CO. KOMMANDITGESELLSCHAFT, HALLSTADT, Hallstadt (DE)

(72) Inventors: Toni Nagler, Bamberg (DE); Markus Rosenthal, Baunach (DE)

(73) Assignee: Brose Fahrzeugteile GmbH & Co. Kommanditgesellschaft, Hallstadt, Hallstadt (DE)

( * ) Notice: Subject to any disclaimer, the term of this patent is extended or adjusted under 35 U.S.C. 154(b) by 236 days.

(21) Appl. No.: 14/940,633

(22) Filed: Nov. 13, 2015

(65) Prior Publication Data

US 2016/0141130 A1 May 19, 2016

(30) Foreign Application Priority Data

Nov. 13, 2014 (DE) ........................ 10 2014 016 826

(51) Int. Cl.
*H02H 5/04* (2006.01)
*H01H 47/22* (2006.01)
*E05F 15/611* (2015.01)

(52) U.S. Cl.
CPC ........... *H01H 47/22* (2013.01); *E05F 15/611* (2015.01); *E05Y 2900/516* (2013.01); *E05Y 2900/546* (2013.01); *E05Y 2900/548* (2013.01)

(58) Field of Classification Search
USPC .................................. 361/23, 139, 144, 160
See application file for complete search history.

(56) References Cited

U.S. PATENT DOCUMENTS

| | | | | | |
|---|---|---|---|---|---|
| 5,004,967 | A * | 4/1991 | Ogasawara | B60N 2/0232 | 297/330 |
| 5,285,139 | A * | 2/1994 | Ogasawara | B60N 2/0244 | 318/286 |
| 5,723,960 | A * | 3/1998 | Harada | H02H 7/0851 | 318/282 |
| 2010/0315193 | A1* | 12/2010 | Hori | H01H 1/02376 | 337/326 |
| 2014/0265978 | A1* | 9/2014 | Oakley | H02P 29/0055 | 318/473 |

FOREIGN PATENT DOCUMENTS

| | | | |
|---|---|---|---|
| DE | 3516985 | A1 | 8/1986 |
| DE | 3811799 | A1 | 10/1989 |
| DE | 19904951 | A1 | 8/2000 |
| DE | 19611064 | C2 | 9/2001 |
| DE | 102004036252 | A1 | 3/2006 |

* cited by examiner

*Primary Examiner* — Danny Nguyen
(74) *Attorney, Agent, or Firm* — Laurence A. Greenberg; Werner H. Stemer; Ralph E. Locher

(57) ABSTRACT

A method operates an electromotive adjusting device of a motor vehicle. The adjusting device contains a relay which has two contacts. The relay is switched by an electric current flow across the contacts or by an electrical voltage drop between the contacts given a first condition. The relay is switched without an electric current flow across the contacts or without an electrical voltage drop between the contacts given a second condition. An electromotive adjusting device of a motor vehicle, in particular an electromotively operated tailgate, contains such a relay which has two contacts.

12 Claims, 2 Drawing Sheets

METHOD FOR OPERATING AN ELECTROMOTIVE ADJUSTING DEVICE, AND ELECTROMOTIVE ADJUSTING DEVICE

CROSS-REFERENCE TO RELATED APPLICATION

This application claims the priority, under 35 U.S.C. § 119, of German patent application DE 10 2014 016 826.3, filed Nov. 13, 2014; the prior application is herewith incorporated by reference in its entirety.

BACKGROUND OF THE INVENTION

Field of the Invention

The invention relates to a method for operating an electromotive adjusting device, and to an electromotive adjusting device. The electromotive adjusting device is a constituent part of a motor vehicle and, in particular, is an electromotively operated tailgate.

Motor vehicles usually contain adjustment parts, for example side windows and/or a sliding roof, which can be opened or closed by an electromotive adjusting drive. The respective adjustment part is operated by a gear mechanism which is driven by an electric motor and is in the form of, in particular, a spindle. In order to set the movement speed of the adjustment part, the electric motor is operated by pulse width modulation (PWM), and therefore sets the supplied electrical energy. In order to configure the control device which is required for this purpose in as cost-effective a manner as possible, the direction of the adjustment part is reversed by a bridge circuit. In this case, an electrical output of the electric motor can be routed either to ground or to the potential of the on-board electrical system, usually 12 volts, by a relay. The other electrical output of the electric motor is electrically connected to the PWM controller which is once again likewise routed either to the potential of the on-board electrical system or else to ground by one or two semiconductor switches. Consequently, the direction of a current flow through the electric motor can be set depending on how the semiconductor switches and the relay are driven, wherein the average current intensity is set by the PWM controller.

If the relay is opened in the event of an electric current flow across its contacts, it is possible for an arc to form between the two contacts. Current continues to flow across the arc, so that current continues to be applied to the electric motor despite the relay being driven to the contrary, that is to say the adjustment part continues to be driven. In addition, the contacts are burnt-up, so that the number of switching processes is limited. It is also possible for further constituent parts of the relay to be damaged by molten metal which is produced as a result of the burn-up. The heat produced in the process can likewise also lead to damage to the relay or else to other components of the adjusting drive. In addition, it is possible for the two contacts to be welded to one another owing to the development of heat and to the partial melting, and therefore the relay is no longer functional. Disconnection of the electric motor by the relay is therefore not possible in this case, this possibly leading to personal injury. It is also possible for the electric motor to be overloaded, this possibly leading to a thermal fault, for example if the adjustment part cannot be moved further, in particular because it is in an end position. Therefore, at least replacement of the relay is necessary for repairing the adjusting drive.

In order to avoid a malfunction of this kind, it is known to initially interrupt a current flow through the electric motor by the semiconductor switch and then to operate the relay. Interrupting the current flow by the semiconductor switch prevents an arc from forming. In order to keep a contact resistance as low as possible when the contacts are closed, it is necessary for the material which is used for the contacts to have a specific electrical resistance which is as low as possible. A material of this kind is, for example, silver. However, if silver is exposed to ambient air, it tends to react with the oxygen which is contained in the ambient air, so that an oxide layer forms on the surface of the contacts. As a result, the conductivity is reduced and the electrical resistance which is formed between the contacts increases. This leads to heating of the relay when the contacts are closed, on account of the increased electrical resistance. In this case, it is again possible for the contacts to be heated in the region of contact in such a way that the contacts partially melt, this leading to the two contacts being welded to one another and to a breakdown in the functioning of the relay. In order to prevent this, it is therefore necessary to produce the contacts from a material which firstly has a comparatively low electrical resistance and secondly is not subject to any chemical reaction with the ambient air. A material of this kind is gold, and for this reason, the relay and therefore also the adjusting drive have comparatively high material costs.

SUMMARY OF THE INVENTION

The invention is based on the object of specifying a particularly suitable method for operating an electromotive adjusting drive of a motor vehicle and also a particularly suitable electromotive adjusting drive of a motor vehicle, wherein advantageously the production costs are reduced and, in particular, reliability is increased.

The method serves to operate an electromotive adjusting device which is a constituent part of a motor vehicle. The electromotive adjusting device has an adjustment part which is moved along an adjustment path by the electric motor. The adjustment part is, for example, a door, such as a sliding door or tailgate, or else a glass pane, such as a side window. As an alternative to this, the adjustment part is a sliding roof or a seat, but at least a constituent part of a seat, such as a backrest or a seat surface. The adjusting device has a relay containing two contacts by which a current flow through the relay can be interrupted. In this case, the relay is switched and the two contacts are either moved into direct mechanical contact with one another or else the direct mechanical contact between the two contacts is broken. In other words, the contact between the two contacts is broken or established when the relay is switched. In order to switch the relay, that is to say to operate the relay, current is supplied, for example, to an electrical coil within which an armature is preferably arranged, the armature being connected, for example, to one of the two contacts. Electrical contact is expediently made with the relay by the electric motor of the electromotive adjusting device, wherein, in particular, one of the contacts of the relay is permanently connected to the electric motor, for example by a line, a cable or the like.

The method makes provision for a first condition and a second condition to be checked in one working step. If the first condition is met, the relay is switched either when there is an electric current flow across the contacts or an electrical voltage is dropped between the two contacts. In other words, the two contacts are disconnected from one another when an electric current flow prevails across the two contacts. The disconnection produces a voltage drop between the two contacts on account of the electrical voltage which is produced for the electric current flow and is applied to the relay. This voltage drop leads to a plasma being formed between the two contacts, for which reason a current flow between the two contacts still lasts for a comparatively short time period. In other words, an arc is produced between the two contacts, the arc collapsing when the contacts are moved further away from one another on account of the increased distance and the therefore increased required electrical voltage for maintaining the arc.

As an alternative, an electrical voltage is applied to the relay given the first condition, if the two contacts are at a distance from one another. The two contacts are therefore moved toward one another during switching and an arc is likewise produced between the contacts on account of the voltage drop which prevails between the contacts, before the two contacts are in direct mechanical contact. On account of the arc, the surface of each of the two contacts is partially melted and any impurities are removed. In summary, when the first condition is fulfilled, the contacts are disconnected from one another when there is an electric current flow across the contacts, or the two contacts are mechanically connected to one another when the electrical voltage drop prevails between the contacts.

If the second condition is met and, in particular, the first condition is not met, the relay is switched when no electric current flow prevails between the two contacts. The relay is likewise switched when there is no electrical voltage drop between the contacts. In other words, the relay is switched when the two contacts make contact with one another and there is no electric current flow through the relay. As an alternative, the relay is switched given the second condition when no electrical voltage is applied to the relay and the two contacts are at a distance from one another. Consequently, when the relay is switched given the second condition, formation of an arc between the contacts is precluded. In summary, when the second condition is fulfilled, the contacts are disconnected from one another when there is no electric current flow across the contacts, or the two contacts are mechanically connected to one another when no electrical voltage drop prevails between the contacts.

Owing to the method, the contacts are freed of any impurities, such as an oxide layer for example, when the first condition is fulfilled. Therefore, an increase in the contact resistance between the two contacts on account of the oxide layer or other impurities equally is precluded. In contrast, when the second condition is fulfilled, formation of the arc and therefore burn-up of the contacts are precluded. Therefore, the service life of the relay is extended, wherein comparatively cost-effective materials can also be used for producing the two contacts. The electric current flow and/or the electrical voltage drop between the contacts, in particular the electrical voltage which is applied to the relay in this case, are/is expediently established by a semiconductor switch which is preferably connected to the relay in series. As an alternative to or in combination with this, the electromotive adjusting device has two relays which are connected in series, wherein switching preferably takes place alternately between the two relays as the arc propagates.

If the second condition is fulfilled, a supply of current to the electric motor is adjusted or interrupted, in particular by a semiconductor switch of the electromotive adjusting device. In other words, a current flow through the relay is terminated or started by the semiconductor switch. In particular, the relay is connected to the electric motor in series.

In particular, the second condition occurs more frequently than the first condition. Burn-up of the contacts is reduced in this way. The formation of an oxide layer or the accumulation of impurities up to the point at which the contact resistance is increased is comparatively slow, so that the relay and therefore the electromotive adjusting drive are functional even in the case of a small number of switching processes with the formation of an arc. In this case, the contacts are damaged only on account of the burn-up when the first condition is fulfilled, wherein this preferably takes place comparatively rarely. The second condition is suitably the complement to the first condition. In other words, either the first condition or else the second condition is fulfilled. Therefore, the relay is switched either when there is a current flow or an applied voltage or else in the absence of the electric current flow or an absence of an applied voltage.

The situation of a specific number of switching processes being exceeded without a current flow across the contacts is expediently used as the first condition. As an alternative to this, the situation of a specific number of switching processes being exceeded without an electrical voltage drop between the contacts is used as the first condition, and preferably the sum of the two switching processes of this kind. Therefore, a switching process in which an arc is formed is carried out when the number of switching processes without the formation of an arc has exceeded the specific number. The number is between 200 and 2000 for example. The specific number is suitably equal to 250, 300, 500, 750, 1000 or 1500 or greater than or less than the respective number. Therefore, for example, 600 switching processes without the formation of an arc are carried out, this being followed by a switching process with the formation of an arc being executed. 600 switching processes without the formation of an arc are then suitably executed again. Therefore, the operating period of the relay is extended since the contacts are only cleaned every 600 switching processes, the cleaning leading to burn-up of the contacts. However, any impurities on the contacts are removed in the process, so that, after a switching process with the formation of an arc is carried out, an electrical contact voltage when the two contacts make contact is comparatively low.

The situation of a specific time period being exceeded is expediently used as the first condition. The time period is started when a switching process with a current flow across the contacts or a switching process with an electrical voltage drop between the contacts takes place. In other words, the specific time period is in each case started with a switching process with the formation of an arc. Therefore, a switching process with the formation of an arc is carried out substantially after each specific time period. In this case, the switching process is, for example, carried out during the directly following operating process of the electric motor or else substantially independently of the operation of the electric motor. The specific time period is preferably matched to the material of the contacts and corresponds to the time after which, for example, oxidation or else contamination of the contacts is to be expected, this corresponding, in particular, to an increase in the contact resistance by 10%, 20%, 30% or 50%. 10 days, 20 days, 1 month, 2 months, 4 months, 6 months or 1 year are/is suitably used as the specific time period.

A position of the adjustment part in an end position is suitably used as the first condition. In other words, the first condition is met if the adjustment part is located in an end position along the adjustment path. In other words, it is not possible to move the adjustment part along the adjustment path beyond the end position on account of mechanical factors. In particular, the end position is delimited by a stop.

Driving of the adjustment part toward the stop is preferably used as the first condition. In other words, a switching process which forms an arc is executed when the adjustment part is driven toward the stop. By way of example, the adjustment part is driven toward the stop by the electric motor and a switching process which forms the arc is carried out after the specific time period elapses and/or the specific number is exceeded. In this way, any user of the electromotive adjusting device cannot detect a difference between the two different switching processes on account of the stationary position of the adjustment part, this leading to an improved impression of the electromotive adjusting device.

The situation of the specific number being exceeded and also the position in the end position and the driving toward the stop are suitably used as the first condition. In other words, different conditions for demonstrating the presence of the first condition are cumulatively met. For example, both the situation of the first time period being exceeded and also the situation of the specific number being exceeded or else either the situation of the specific number being exceeded or the situation of the specific time period being exceeded is/are met, wherein the adjustment part is expediently always located in the end position in order to meet the first condition.

By way of example, an electrical circuit which contains the electric motor is closed or opened by the relay. In other words, the relay functions as a switch. In this case, the relay is used, in particular, in the manner of a safety switch. A rotation direction of the electric motor is particularly preferably set by the relay. To this end, the relay preferably contains three contacts, wherein the electric motor makes contact with one of the three contacts in a pivotable and electrically permanent manner. From amongst the remaining two contacts, one contact is electrically permanently contact-connected for example to a potential of an on-board electrical system of the motor vehicle and the remaining contact is electrically permanently contact-connected to ground. The voltage which prevails between these two contacts is preferably 12 V. In order to execute the switching process, the contact with which the electric motor makes electrically permanent contact is pivoted between the remaining two contacts, wherein the contact can, for example, also assume a position between the two contacts. In this way, the rotation direction of the electric motor can be set in a comparatively robust manner.

The electric motor is suitably operated by pulse width modulation (PWM). In this way, the electrical energy which is supplied to the electric motor can be set in a comparatively precise manner and therefore the acceleration, braking and therefore also the speed of the adjustment part can be set. In this case, the electrical losses are comparatively low, so that the efficiency of the electromotive adjusting device is comparatively high.

The electromotive adjusting device of a motor vehicle is expediently an electromotively operated tailgate. In other words, a tailgate is pivoted into an open and/or closed position by the electric motor. The electromotive adjusting device has a relay which contains at least two contacts. The electric motor is preferably operated by the relay. To this end, the relay is expediently a constituent part of an electrical circuit which likewise contains the electric motor. The relay is switched by an electric current flow across the contacts or an electrical voltage drop between the contacts if a first condition is met. If a second condition is met, the relay is switched without an electric current flow across the contacts and/or without an electrical voltage drop between the contacts. To this end, the electromotive adjusting device expediently contains a control unit within which the method is implemented.

In particular, the contacts of the relay are free of gold. In other words, the contacts are not composed of gold or an alloy which contains gold. As an alternative to or in combination with this, the contacts are free of palladium, that is to say are palladium-free. The material and production costs of the relay and of the electromotive adjusting device are reduced in this way. The contacts are expediently produced from silver tin oxide ($AgSnO_2$) and are expediently composed of the compound. Comparatively simple and cost-effective production of the relay is possible in this way. It is also possible to use a relay which is available in comparatively large quantities.

The electric motor is, in particular, in the form of a rotating machine. A spindle is expediently driven by the electric motor. A rotation movement of the electric motor is converted into a translatory movement in this way. The electromotive adjusting device suitably has at least two electric motors which are connected to one another, for example, in parallel or in series. The two electric motors are preferably operated by the same relay. In other words, the electromotive adjusting device preferably has only one single relay. As an alternative, the electromotive adjusting device contains two relays which are connected in series. In this case, one of the relays is provided, in particular, for setting the rotation direction of the electric motor or electric motors, and the remaining relay is provided for preventing unintentional start-up of the electric motor or electric motors.

Other features which are considered as characteristic for the invention are set forth in the appended claims.

Although the invention is illustrated and described herein as embodied in a method for operating an electromotive adjusting device, and an electromotive adjusting device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Parts which correspond to one another are provided with the same reference symbols throughout the figures.

Figure 1:
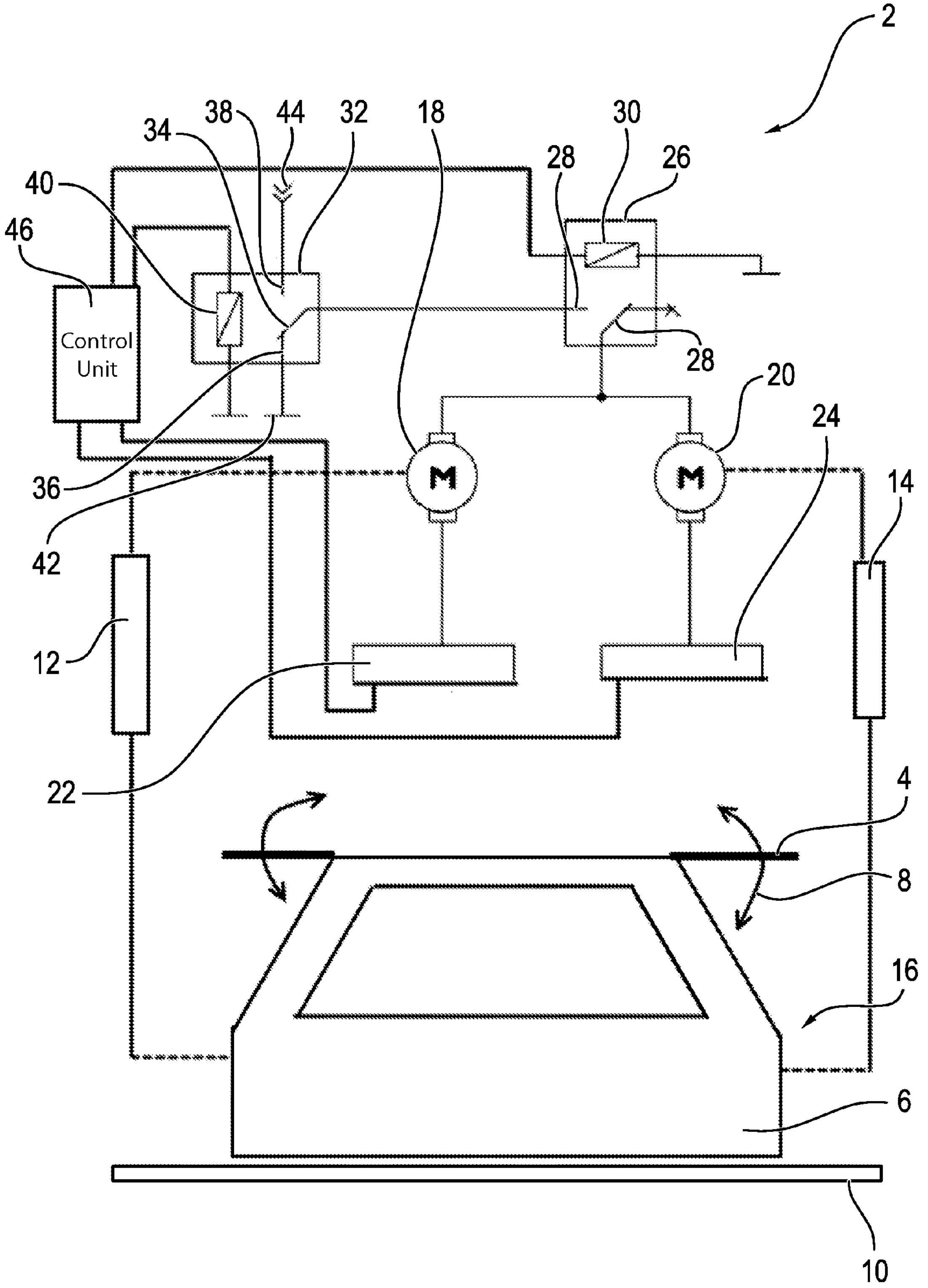
FIG. 1 is a schematic diagram showing an electromotively operated tailgate according to the invention.

Referring now to the figures of the drawings in detail and first, particularly to FIG. 1 thereof, there is shown an electromotively operated tailgate 2 containing a hatch 6 which is mounted such that it can pivot about a pivot axis 4 and by which a trunk space, not illustrated, in a motor vehicle is covered. To this end, the hatch 6 can be moved toward a stop 10 in a pivot direction 8 about the pivot axis 4, the stop being formed by a vehicle body. A first spindle 12 and a second spindle 14 are connected to the hatch 6, so that a position 16 of the hatch 6 in relation to the stop 10 can be set by the two spindles 12, 14. The first spindle 12 is driven by a first electric motor 18, and the second spindle 14 is driven by a second electric motor 20. A first pulse width modulation unit 22 makes electrical contact with the first electric motor 18, and a second pulse width modulation unit 24 makes electrical contact with the second electric motor 20. The first electric motor 18 and the second electric motor 20 are further routed toward a first relay 26 which has two first contacts 28 which are produced from $AgSnO_2$ and which can be moved into direct mechanical contact by a first coil 30. The direct mechanical contact between the two first contacts 28 can likewise be broken by the first coil 30. In other words, direct mechanical contact between the two first contacts 28 is established or broken when the first relay 26 is switched.

If the two first contacts 28 are in direct mechanical contact, a second relay 32, which has a second contact 34, a third contact 36 and a fourth contact 38, makes electrical contact with the two electric motors 18, 20. Just like the two first contacts 28, the second contact 34, the third contact 36 and the fourth contact 38 are likewise produced from $AgSnO_2$. The second contact 34 can be pivoted between the third contact 36 and the fourth contact 38, so that the second contact 34 is either in direct mechanical contact with the third contact 36 or with the fourth contact 38. The position of the second contact 34 is set by a second coil 40. The third contact 36 is electrically contact-connected to ground 42, and the fourth contact 38 is electrically contact-connected to an on-board electrical system potential 44, wherein the electrical voltage between the on-board electrical system potential 44 and ground 42 is 12 volts. The two relays 26, 32 are operated by a control unit 46 by which current is supplied to the respective coil 30, 40 in order to move the respective contact 28, 34. Both the first pulse width modulation unit 22 and the second pulse width modulation unit 24 are likewise coupled to the control unit 46 so as to transmit signals. Each of the two pulse width modulation units contains two semiconductor switches, in particular MOSFETs, not illustrated, by which the input of the respective electric motor 18, 20, the input being coupled to the respective pulse width modulation unit 22, 24, is routed either to ground 42 or the on-board electrical system potential 44.

In this case, a pulsed electric current flow is created through the respective electric motors 18, 20 and therefore the rotation speed of the electric motors is set given suitable driving of the relays 26, 32 by the respective pulse width modulation unit 22, 24, wherein the rotation direction is determined by the second relay 32. The hatch 6 is pivoted about the pivot axis along the pivot direction 8, that is to say is moved toward the stop 10 or away from the stop, depending on the rotation direction of the electric motor.

Figure 2:
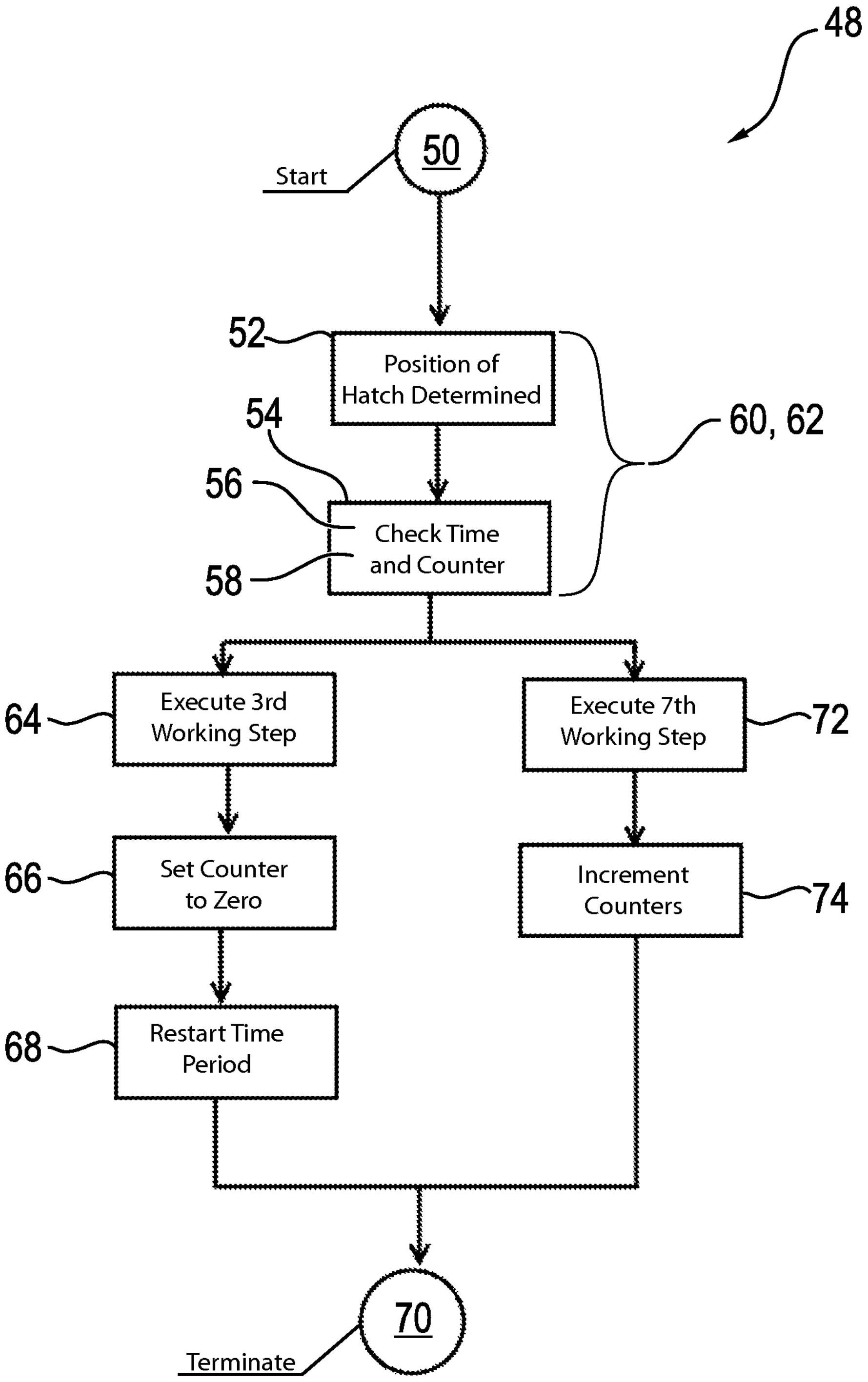
FIG. 2 is a flowchart showing a method for operating the electromotive tailgate according to the invention.

The control unit 46 is operated in accordance with a method 48 illustrated in FIG. 2. After a start event 50 which corresponds to starting of an internal combustion engine of the motor vehicle, a position 16 of the hatch 6 in relation to the stop 10 and also a movement of the hatch 6 which is desired by a user are determined in a first working step 52. If the hatch 6 is in an end position, that is to say the hatch 6 bears against the stop 10, for example after movement has taken place, a counter and also a time of day are checked and compared with a specific number 56 and a specific time period 58 in a second working step 54. In this case, the specific number 56 is 250, and the specific time period 58 is two months. If the number is greater than the specific number 56, and the time period is longer than the specific time period 58, a first condition 60 is met and a second condition 62 is not met. In other words, the first condition 60 is met when the second condition 62 is not met, and the second condition 62 is met when the first condition 60 is not met. In this case, the first condition 60 is met when the hatch 6 is in the end position and the number is greater than the specific number 56 and the time period is longer than the specific time period 48.

When the first condition 60 is met, a third working step 64 is executed, in which the first or second relay 26, 28 is switched provided that there is a current flow across the respective contacts 28, 34, 36, 38 or else there is an electrical voltage drop between the contacts 28, 34, 36, 38. Therefore, for example after a closing movement of the hatch 6, current is further supplied to the electric motors 18, 20 by the respective pulse width modulation unit 22, 24, and the hatch 6 is driven toward the stop 10. As soon as the end position is reached, the first relay 26 is switched by current being supplied to the first coil 30. Consequently, the two contacts 28 are mechanically disconnected, wherein an arc forms between the two contacts. Consequently, an oxidation layer is removed from the contacts 28 on account of the development of heat and partial melting of the contacts 28.

During a subsequent opening movement of the hatch 6 which takes place, for example, by a foot-operated switch or remote operator control of the motor vehicle, the semiconductor switches of the pulse width modulation units 22, 24 are initially driven in such a way that they are now electrically connected to ground 42. Following this, pulses are produced by the pulse width modulation units 22, 24 and the first relay 26 is driven, so that the two contacts 28 are in direct mechanical contact. Consequently, the two pulse width modulation units 22, 24 are routed to ground 42 by the two electric motors 18, 20, the first relay 26 and also the second contact 34 and the third contact 36. There is therefore no current flow across the electric motors 18, 20, but there is an electrical voltage drop between the second contact 34 and the fourth contact 38. As soon as this is produced, the second relay 32 is switched by current being supplied to the second coil 40, and the second contact 34 is moved in the direction of the fourth contact 38. Before direct mechanical contact is made between the two contacts 34, 38, an arc which removes any existing oxidation layer on the two contacts 34, 38 and also impurities which are located there is produced on account of the electrical voltage of 12 volts which prevails between the two contacts 34, 38.

After operation of the respective relay 26, 32 in the third working step 64, the counter is set to zero in a fourth working step 66, wherein separate counters are used for the first relay 26 and the second relay 32. In a subsequent fifth working step 68, the time period is restarted, wherein different time periods are used for the two relays 26, 32 in this case too. The start of the respective time period is the operation of the respective relay 26, 32 with propagation of an arc. The method 48 is subsequently terminated by a sixth working step 70.

If the first condition 60 is not met and therefore the second condition 62 is met, a seventh working step 72 is executed after the second working step 54, both the first relay 26 and also the second relay 32 being operated in the seventh working step when there is neither a current flow across the respective contacts 28, 34, 36, 38 nor an electrical voltage difference between the contacts, that is to say no electrical voltage drop between the contacts 28, 34, 36, 38. To this end, the semiconductor switches of the pulse width modulation units 22, 24 are moved to the electrical potential of the second contact 34, that is to say either ground 42 or else the on-board electrical system potential 44, before disconnection of the first contacts 28. The two first contacts 28 are disconnected only after this.

If the movement direction of the hatch 6 is intended to be changed, the second relay 32 is subsequently operated and the second contact 34 is moved into direct mechanical contact with the fourth contact 38. The semiconductor switches of the two pulse width modulation units 22, 24 are subsequently driven in such a way that they are at the on-board electrical system potential 44. Following this, the first relay 26 is driven and the two first contacts 28 are moved into direct mechanical contact. Therefore, no arc is produced during the switching processes of the two relays 26, 32 on account of the absence of a potential difference, and the contacts 26, 34, 36, 38 are not eroded. The semiconductor switches of the pulse width modulation units 22, 24 are again operated only following this, this leading to movement of the two electric motors 18, 20. In a subsequent eighth working step 74, the counters which were checked in the second working step 54 are incremented by one. The method is subsequently likewise terminated with the sixth working step 70.

The invention is not restricted to the exemplary embodiment described above. Instead, other variants of the invention can also be derived from said exemplary embodiment by a person skilled in the art, without departing from the subject matter of the invention. In particular, all of the individual features described in connection with the exemplary embodiment can furthermore also be combined with one another in a different way, without departing from the subject matter of the invention.

The following is a summary list of reference numerals and the corresponding structure used in the above description of the invention:

2 Electromotively operated tailgate
4 Pivot axis
6 Hatch
8 Pivot direction
10 Stop
12 First spindle
14 Second spindle
16 Position
18 First electric motor
20 Second electric motor
22 First pulse width modulation unit
24 Second pulse width modulation unit
26 First relay
28 First contact
30 First coil
32 Second relay
34 Second contact
36 Third contact
38 Fourth contact
40 Fourth coil
42 Ground
44 On-board electrical system potential
46 Control unit
48 Method
50 Start event
52 First working step
54 Second working step
56 Specific number
58 Specific time period
60 First condition
62 Second condition
64 Third working step
66 Fourth working step
68 Fifth working step
70 Sixth working step
72 Seventh working step
74 Eighth working step

The invention claimed is:

1. A method for operating an electromotive adjusting device of a motor vehicle, the electromotive adjusting device having a relay which has two contacts, which comprises the steps of:
- switching the relay with an electric current flow across the contacts or by an electrical voltage drop between the contacts given a first condition and resulting in a formation of an arc between the contacts; and
- switching the relay without the electric current flow flowing across the contacts or without the electrical voltage drop between the contacts given a second condition and resulting in no formation of the arc between the contacts, the electric current flow flowing across the contacts or the electric voltage drop between the contacts being interrupted by a further semiconductor switch being switched.

2. The method according to claim 1, which further comprises using a complement to the first condition as the second condition.

3. The method according to claim 1, which further comprises defining a specific number of switching processes without the electric current flow across the contacts or without the electrical voltage drop between the contacts being exceeded as the first condition.

4. The method according to claim 1, which further comprises defining a specific time period since a preceding switching process with the electric current flow across the contacts or with the electrical voltage drop between the contacts being exceeded as the first condition.

5. The method according to claim 1, which further comprises defining a position of an adjustment part in an end position, and driving of the adjustment part toward a stop, as the first condition.

6. The method according to claim 1, which further comprises setting a rotation direction of an electric motor by means of the relay.

7. The method according to claim 6, which further comprises operating the electric motor using pulse width modulation.

8. An electromotive adjusting device for a motor vehicle, comprising:
- a semiconductor switch;
- a relay having two contacts and connected to said switch, said relay being switched resulting in an electric current flow across said contacts or by an electrical voltage drop between said contacts given a first condition and resulting in a formation of an arc between said contacts; and
- said relay being switched without the electric current flow across said contacts or without the electrical voltage drop between said contacts given a second condition and resulting in no formation of the arc between said contacts, the electric current flow flowing across the contacts or the electric voltage drop between the contacts being interrupted by said semiconductor switch being switched.

9. The electromotive adjusting device according to claim 8, wherein said contacts are free of gold and/or palladium.

10. The electromotive adjusting device according to claim 8, further comprising:

an electric motor; and a spindle being driven by said electric motor.

11. The electromotive adjusting device according to claim 8, wherein the electromotive adjusting device is for an electromotively operated tailgate of the motor vehicle.

12. The electromotive adjusting device according to claim 8, wherein said contacts are composed of $AgSnO_2$.

* * * * *